(12) United States Patent
Crombez et al.

(10) Patent No.: US 11,820,254 B2
(45) Date of Patent: Nov. 21, 2023

(54) HYBRID ELECTRIC VEHICLE WITH TORQUE SPLIT REGENERATIVE BRAKING

(71) Applicant: Ford Global Technologies, LLC, Dearborn, MI (US)

(72) Inventors: Dale Scott Crombez, Livonia, MI (US); Ming Lang Kuang, Canton, MI (US); Yanan Zhao, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 714 days.

(21) Appl. No.: 15/970,469

(22) Filed: May 3, 2018

(65) Prior Publication Data
US 2019/0337391 A1    Nov. 7, 2019

(51) Int. Cl.
B60L 7/18       (2006.01)
B60L 3/10       (2006.01)
B60W 30/02      (2012.01)
B60W 30/18      (2012.01)
B60W 40/114     (2012.01)
B60W 40/068     (2012.01)

(52) U.S. Cl.
CPC ............. B60L 7/18 (2013.01); B60L 3/108 (2013.01); B60W 30/02 (2013.01); B60W 30/18127 (2013.01); B60W 30/18145 (2013.01); B60W 40/068 (2013.01); B60W 40/114 (2013.01); B60T 2270/604 (2013.01); B60W 2520/26 (2013.01); B60W 2540/18 (2013.01); B60W 2710/18 (2013.01); B60Y 2300/89 (2013.01)

(58) Field of Classification Search
CPC ............ B60L 7/18; B60L 3/108; B60W 30/02
USPC .......................................................... 303/152
See application file for complete search history.

(56) References Cited

U.S. PATENT DOCUMENTS

| 5,539,641 | A  | * | 7/1996  | Littlejohn ............. B60T 8/1764 303/169 |
| 5,573,312 | A  | * | 11/1996 | Muller .................... B60L 3/102 303/189 |
| 6,702,404 | B2 | * | 3/2004  | Anwar ...................... B60L 7/26 188/162 |
| 6,957,874 | B2 |   | 10/2005 | Hara et al. |

(Continued)

Primary Examiner — Robert A. Siconolfi
Assistant Examiner — San M Aung
(74) Attorney, Agent, or Firm — David B. Kelley; Brooks Kushman P.C.

(57) ABSTRACT

A hybrid electric vehicle having one or more controllers, at least two independently driven electric machines (EMs) that are each coupled to separate drive wheels, and controllers configured to generate a torque split ratio responsive to lateral acceleration and/or unequal friction coefficients detected during braking, and to generate electric power with the motors by regeneratively braking each wheel with unequal torques adjusted by the ratio, such that combined wheel braking torques do not exceed a total braking torque limit for the vehicle. In some configurations, the controller(s) generate the torque split ratio by a predetermined lookup table that maps a plurality of torque split ratios to lateral accelerations, the coefficients, and other parameters. Further arrangements include the controller(s) coupled with sensors that detect wheel slip and yaw rate, and responsive to a braking signal, the controller(s) disengage regenerative braking when the wheel slip and/or vehicle yaw are detected.

17 Claims, 3 Drawing Sheets

(56) References Cited

U.S. PATENT DOCUMENTS

| | | | | |
|---|---|---|---|---|
| 8,998,353 | B2 | 4/2015 | Chen et al. | |
| 9,008,876 | B2 | 4/2015 | Pinto et al. | |
| 2002/0163250 | A1* | 11/2002 | Huls | B60L 50/61 |
| | | | | 188/158 |
| 2004/0090116 | A1* | 5/2004 | Tsunehara | B60T 8/267 |
| | | | | 903/947 |
| 2005/0264102 | A1* | 12/2005 | Tezuka | B60K 7/0007 |
| | | | | 303/152 |
| 2008/0162009 | A1* | 7/2008 | Miki | B60T 8/00 |
| | | | | 701/80 |
| 2008/0234909 | A1* | 9/2008 | Iwasaki | B62D 5/065 |
| | | | | 701/70 |
| 2009/0178876 | A1* | 7/2009 | Miki | B62D 7/142 |
| | | | | 701/41 |
| 2009/0256417 | A1* | 10/2009 | Ishii | B60T 8/267 |
| | | | | 303/152 |
| 2011/0221265 | A1* | 9/2011 | Busack | B60T 8/17616 |
| | | | | 303/152 |
| 2013/0144476 | A1* | 6/2013 | Pinto | B60T 8/17555 |
| | | | | 903/930 |
| 2013/0144479 | A1* | 6/2013 | Ito | B60L 3/0076 |
| | | | | 701/22 |
| 2013/0325233 | A1* | 12/2013 | Whitney | B60K 23/0808 |
| | | | | 180/65.265 |
| 2015/0307086 | A1* | 10/2015 | Ketfi-Cherif | B60W 10/08 |
| | | | | 180/65.265 |
| 2016/0039405 | A1* | 2/2016 | Terayama | B60K 6/442 |
| | | | | 903/906 |
| 2017/0183008 | A1* | 6/2017 | Isono | B60W 30/18172 |

* cited by examiner

HYBRID ELECTRIC VEHICLE WITH TORQUE SPLIT REGENERATIVE BRAKING

TECHNICAL FIELD

The present disclosure relates generally to systems and methods for control and utilization of independent motors/generators for energy regeneration in a hybrid electric vehicle.

BACKGROUND

Electric, plug-in, battery, full, and mild hybrid electric vehicles (HEVs), have a powertrain that includes, among other components, an internal combustion engine (CE), at least two electric machines or motor/generators (EMs), batteries and other energy storage devices, and multiple drive axles, which are each coupled with one or more controllers, and which include the EMs to each be coupled with a single drive wheel. Such EMs in past applications have been configured to symmetrically generate propulsive acceleration and drive power and to regenerate energy during braking and deceleration.

Other configurations have included asymmetric propulsive acceleration and regenerative deceleration control, but have required computationally intensive methods requiring higher computing power and resources, which increased costs, slower response times, and which limited application to vehicles that are equipped with additional and more expensive computing systems. What has been needed are improved control systems for multiple EM HEVs and asymmetrical power regeneration during braking and cornering conditions, which enable maximum braking torque and regenerative energy capture, with high speed response times, and without the need for high power and otherwise unnecessary computing resources.

SUMMARY

A vehicle and methods of operation according to the present disclosure include various components and systems that include one or more controllers coupled with a powertrain that has at least two EMs each coupled to respective drive wheels. The disclosure is directed to generating asymmetric maximum regenerative braking torque with the motors, when opposite side wheels have unequal friction coefficients, such as during cornering and certain vehicle, road, wheel, and wheel dynamics conditions, and without exceeding predetermined braking force limits, such that wheel to road slip is prevented.

The disclosure includes the HEV having left and right drive wheels that are each coupled to a respective electric motor. The HEV also incorporates one or more and/or at least one controller(s) configured to generate a torque split ratio during braking, in response to one or more of: a lateral acceleration during cornering, and/or unequal friction coefficients detected for each wheel during braking. The controller(s) are also configured to generate electric power with the motors by regeneratively braking each wheel with unequal torques adjusted by the ratio, and such that combined wheel braking torques do not exceed a total braking torque limit for the vehicle. The total braking limit for the vehicle is predetermined and is a function of vehicle weight, speed, acceleration/deceleration, and wheel and road friction, among other parameters.

In further arrangements, the HEV also includes the controller(s) further configured to respond to a braking signal, and to adjust the total braking torque limit in further response to one or more of vehicle speed, deceleration rate, and configuration. In variations, the controller(s) are also coupled to one or more vehicle and road condition and wheel dynamics sensors, and are also responsive to the braking signal to generate the unequal friction coefficients for each wheel in response to vehicle and road conditions detected by the sensors.

The disclosure contemplates the vehicle condition sensors configured to detect conditions that include one or more of lateral and longitudinal accelerations, steering angle, yaw rate, and vehicle speed and configuration, among other parameters that may result in unequal friction coefficients. The road condition sensors are configured to detect one or more of ice, snow, water, and roadway polishing and flushing, among other conditions that may also affect the coefficients. Also, the wheel dynamics sensors are configured to detect wheel conditions and dynamics that may affect the generated coefficients and which include, for example, tire pressure and temperature, rotation speed, wheel slip, total distance driven and estimated tread wear parameters, and differences in speed between driven, non-driven, left, right, front, and rear wheels during acceleration and braking, among other parameters.

During regenerative braking, the controller(s) adjust EMs and power electronics of HEV to charge the one or more batteries utilizing the generated power. The controller(s) are also configured in modified arrangements to detect a one or more of a vehicle antilock mode of operation, wheel slip, and vehicle yaw rate, among other parameters, and to disengage regenerative braking by the EMs, when at least one of the wheel slip, vehicle yaw, and/or other parameters are detected.

In other adaptations of the disclosure, the HEV or vehicle condition sensors include one or more lateral acceleration sensor(s) that detect lateral acceleration magnitude and direction during vehicle operations such as cornering. Here, the vehicle also includes the controller(s) further configured to generate the unequal friction coefficients for each wheel, such as left and right vehicle wheels, in response to the detected lateral acceleration, and to generate the torque split ratio by a predetermined lookup table, which maps a plurality of torque split ratios to respective lateral accelerations.

In further modifications of the disclosure, the HEV or vehicle includes the one or more vehicle condition sensors, and the at least one controller further configured, in response to the braking signal, to generate the unequal friction coefficients for each wheel responsive to detected vehicle conditions that include one or more of lateral and longitudinal accelerations, steering angle, yaw rate, and vehicle speed and configuration. In these modifications, the controller(s) are also configured to generate the torque split ratio by the predetermined lookup table mapping a plurality of torque split ratios to one or more of the accelerations, steering angle, yaw rate, vehicle speed, vehicle configuration, and/or other vehicle conditions and parameters.

The disclosure further contemplates variations of the HEV or vehicle including the one or more vehicle and road condition and wheel dynamics sensors, and to have the controller(s) further configured, responsive to the braking signal, to generate the unequal friction coefficients for each wheel in response to the detected vehicle and road conditions, and the dynamics of the one or more wheels. Other arrangements also include the HEV or vehicle having the one or more wheel condition and/or dynamics sensors, and the at least one controller(s) further configured, in response to braking and acceleration, to generate the unequal friction coefficients for each wheel in response to detected dynamics of the wheels.

Each of such variations of the disclosure also contemplate methods of controlling the HEV or vehicle, by the at least one or one or more controller(s), being coupled to the left and right drive wheels each having the respective electric motors, among other components. The methods include generating the torque split ratio utilizing the lateral acceleration detected during braking, and in response to the braking signal, and generating electric power with the motors by regeneratively braking each wheel with unequal torques adjusted by the ratio, such that combined wheel braking torques do not exceed a total braking torque limit for the vehicle. As with the other described modifications, the methods also contemplate, by the at least one controller, generating the torque split ratio by the predetermined lookup table that maps a plurality of torque split ratios to respective lateral accelerations, among other vehicle, road, and wheel dynamics and conditions.

The disclosure also includes in other arrangements of the methods, by the at least one controller, and in response to the braking signal, detecting by the one or more vehicle sensors, at least one of wheel slip and vehicle yaw rate, and disengaging regenerative braking when the at least one of wheel slip and vehicle yaw are detected. The methods also include, by the at least one controller, and responsive to the braking signal, detecting the unequal friction coefficients for each wheel in response to the detected vehicle and road conditions, and the wheel conditions and dynamics.

Additional modifications of the contemplated methods of the disclosure include the one or more vehicle, wheel, and road condition wheel dynamics sensors, and by the at least one controller and in response to a braking signal, generating the unequal friction coefficients for each wheel, with detected vehicle, road, and wheel conditions and wheel dynamics, including, for example, vehicle conditions that include one or more of the lateral acceleration, and longitudinal acceleration, steering angle, yaw rate, and vehicle speed and configuration, road conditions that include one or more of ice, snow, water, polishing, and flushing, and dynamics of one or more wheels including differences in speed between driven, non-driven, left, right, front, and rear wheels during acceleration and braking.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
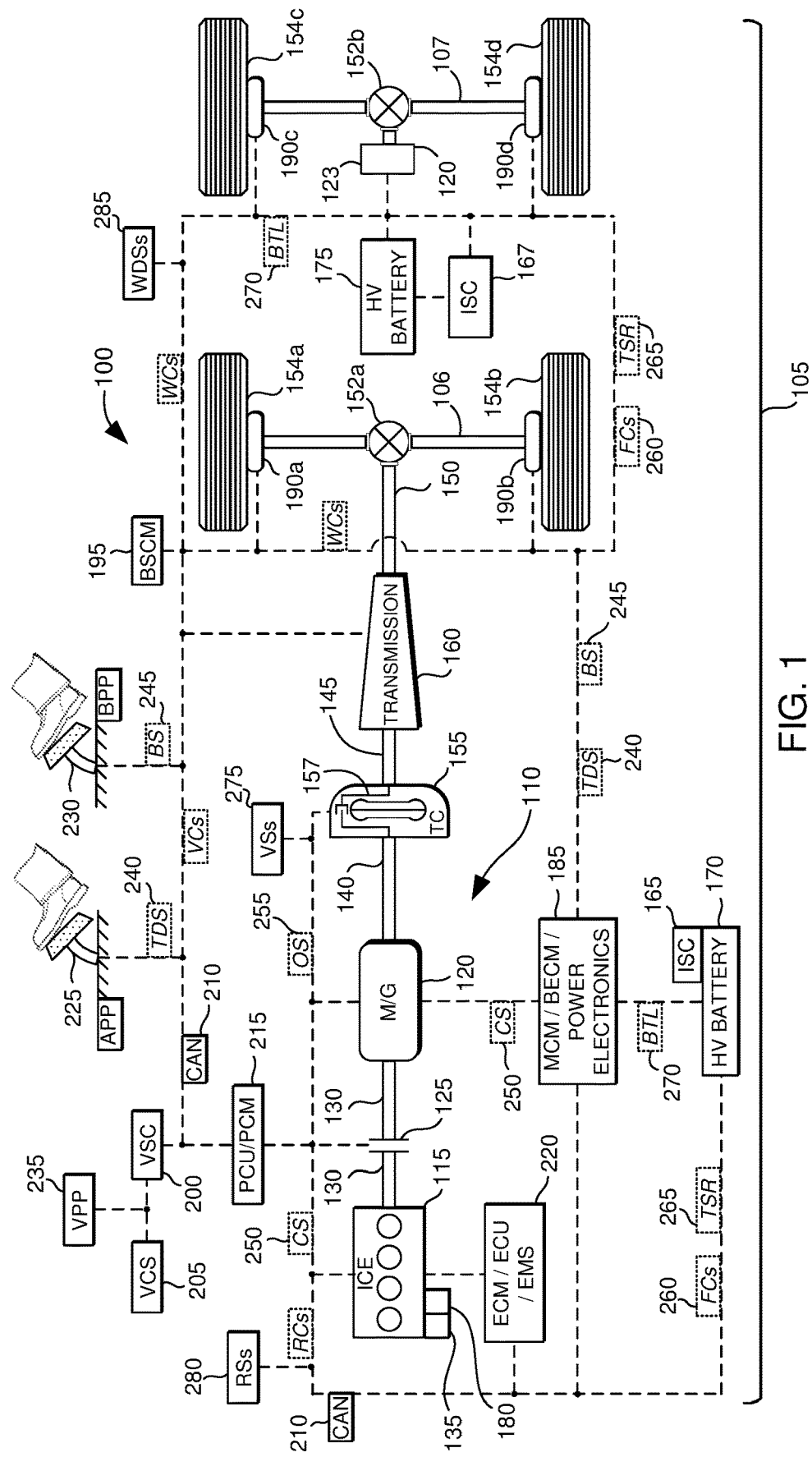
FIG. 1 is an illustration of a hybrid electric vehicle and its systems, components, sensors, and methods of operation.
Figure 2:
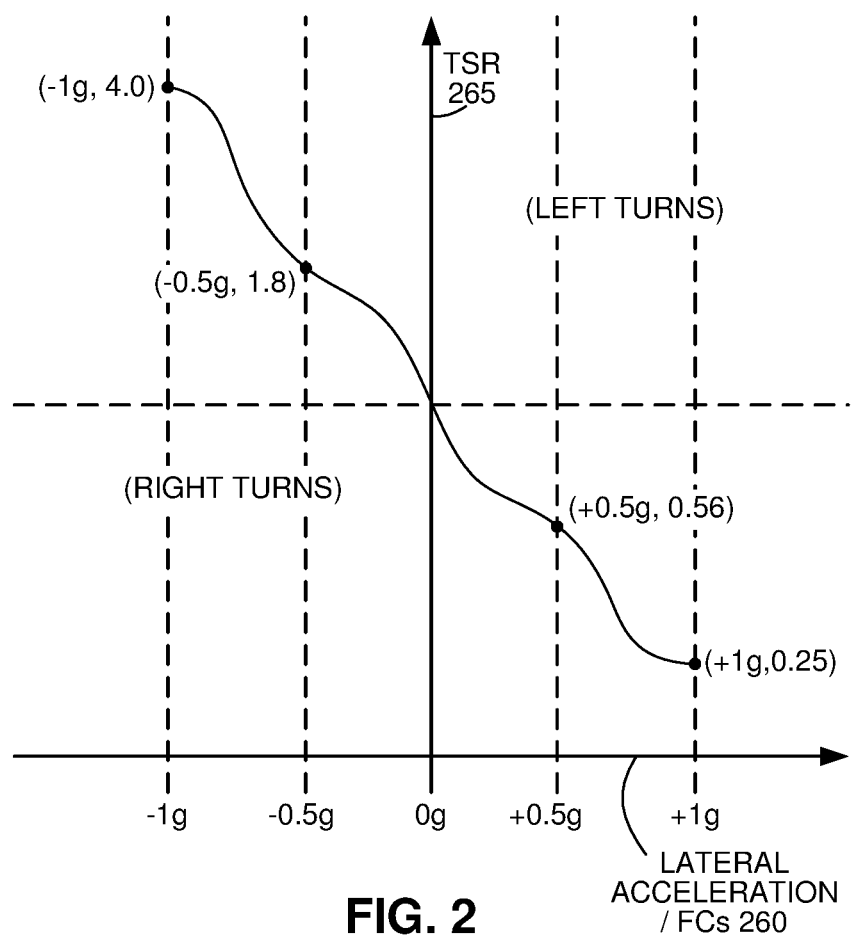
FIG. 2, depicts a schematic representation of aspects of the vehicle and systems of FIG. 1.

With reference now to the various figures and illustrations and to FIGS. 1 and 2, and specifically to FIG. 1, a schematic diagram of an electric, battery, plug-in, and/or HEV 100 is shown, and illustrates representative relationships among components of HEV 100. Physical placement and orientation of the components within vehicle 100 may vary. Vehicle 100 includes a driveline 105 that has one or more axle(s) 106, 107, and a powertrain 110, which includes one or more of an internal combustion engine (CE, ICE) 115 and/or electric machine or electric motors/generators/starters (EMs) 120, 123, and others, which generate power and torque to propel vehicle 100 via the at least one or one or more axle(s) 106, 107, which are contemplated by this disclosure and reflected in FIG. 1 to be mechanically decoupled from one another to enable independent operation.

Although the figures depict axles 106, 107 and related components appearing to be physically adjacent, the figures are only intended to be schematic representations, and contemplate axle(s) 106, 107, as well as all other components, to be arranged according to various other physical arrangements. For example, despite the schematic representation, axle(s) 106, 107 may be arranged on an HEV 100 as separated, independently operable, front and rear wheel drive axles 106, 107, and in other physical arrangements that should be apparent to those knowledgeable in the relevant fields of technology.

Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories and accessory devices (FEADs) described elsewhere herein. ICE or CE 115 is coupled to at least one of the electric machines or EMs 120, 123, and others, with a disconnect clutch 125, and at least one of the axles 106, 107. CE 115 generates such power and associated engine output torque for transmission to EM 120 when disconnect clutch 125 is at least partially engaged.

EMs 120, 123, and others such as later-described EMs 190a, 190b, 190c, and 190d, may be any one of a plurality of types of electric machines, and for example may be a permanent magnet synchronous motor, an electrical power generator, and an engine starter. For example, when disconnect clutch 125 is at least partially engaged, power and torque may be transmitted from engine 115 to EM 120 to enable operation as an electric generator, and to other components of vehicle 100. Similarly, the EMs 120, 123, and others, coupled to the same axle(s) 106, 107 as CE/ICE 115 may operate as a starter for engine 115 with disconnect clutch 125 partially or fully engaged to transmit power and torque via disconnect clutch drive shafts 130 to CE 115 to start engine/ICE/CE 115, in vehicles that include or do not include an independent engine starter 135.

In additional variations, EM 120 may also be an electric axle drive such as EM 123 that is configured as either an electric front axle drive (EFAD) or an electric rear axle drive (ERAD) that is directly coupled with one of the axles 106, 107, via a gear box and/or differential(s) 152a, 152b. Further, in such arrangements EFAD/ERAD 123 may be configured to operate independently of other EMs 120, and others, and/or CE 115, to enable selectable and differential control between mechanically decoupled axle(s) 106, 107, and/or associated wheels 154a, 154b, 154c, 154d.

Further, at least one EMs 120, 123, and others, may assist engine 115 in a "hybrid electric mode" or an "electric assist mode" by transmitting additional power and torque to turn drive shafts 130 and 140. Also, EMs 120, 123, and others, may operate in an electric only mode wherein engine 115 is decoupled by disconnect clutch 125 and shut down, enabling EMs 120, 123, and others, to transmit positive or negative torque to EM drive shaft 140 and/or axle(s) 106, 107. When in generator mode, EMs 120, 123 (as well as later-described EMs 190a, 190b, 190c, 190d) may also be commanded to produce negative torque and to thereby generate electricity for charging batteries (and other energy storage devices) and powering vehicle electrical systems, while engine or ICE 115 is generating propulsion power for vehicle 100. EMs 120, 123 (and EMs 190a, 190b, 190c, 190d) also may enable regenerative, differential or split torque braking by converting rotational energy from decelerating powertrain 110 and/or wheels 154a, 154b, 154c, 154d, into electrical energy for storage, as described in more detail below, in one or more batteries 170, 175, 180, and other energy storage devices.

Disconnect clutch 125 may be disengaged to enable engine 115 to stop or to run independently for powering engine accessories, while EMs 120, 123, and others, generate drive power and torque to propel vehicle 100 via axle(s) 106, 107, and/or EM drive shaft 140, torque convertor drive shaft 145, and transmission output drive shaft 150. In other arrangements, both engine 115 and EMs 120, 123 may operate with disconnect clutch 125 fully or partially engaged to cooperatively propel vehicle 100 through drive shafts 130, 140, 150, differentials 152a, 152b, and wheels 154a, 154b, 154c, 154d. Various configurations and utilizations of EMs 120, 123, 190a, 190b, 190c, 190d, may be employed to enable differential control and traction between axle(s) 106, 107, and/or associated wheels 154a, 154b, 154c, 154d.

Differentials 152a, 152b may transmit approximately equal torque to each of associated wheels 154a, 154b, 154c, 154d, and may accommodate slight speed differences to enable the vehicle to efficiently turn and maneuver. Different types of differentials 152a, 152b, or similar devices may be used to distribute equal or symmetric, and/or unequal, differential, and asymmetric torque from powertrain 110 to wheels 154a, 154b, 154c, 154d, for rear-dive, front-drive, front-axle, rear-axle, and all-wheel drive vehicles and configurations. In some vehicles, differential, split torque distribution may be electronically controlled by the various controllers, and varied to enable desired operating modes or conditions wherein axles 106, 107, and/or each wheel 154a, 154b, 154c, 154d, receives different, asymmetric torque. Similarly, during regenerative braking modes, EMs 120, 123 (and later-described EMs 190a, 190b, 190c, 190d) may be configured to recapture mechanical energy from axles 106, 107, and/or wheels 154a, 154b, 154c, 154d, for symmetrical and/or differential, split-torque braking and/or to generate electrical energy for recharging one or more batteries 170, 175, 180, and/or other energy storage devices.

Drive shaft 130 of engine 115 and EM 120 may be a continuous, single, through shaft that is part of and integral with EM drive shaft 140, or may be a separate, independent drive shaft 130 that may be configured to turn independently of EM drive shaft 140, for powertrains 110 that include multiple, inline, or otherwise coupled EM 120 configurations. The schematic of FIG. 1 also contemplates alternative configurations with more than one engine 115 and/or EMs 120, 123, which may be offset from drive shafts 130, 140, and where one or more of engines 115 and EMs 120, 123 are positioned in series and/or in parallel elsewhere in driveline 105, and/or about axles 106, 107, such as between or as part of a torque convertor and a transmission, off-axis from the drive shafts, axles 106, 107, and/or elsewhere and in other arrangements. Still other variations are contemplated without deviating from the scope of the present disclosure.

Driveline 105 and powertrain 110 also include a torque convertor (TC) 155, which couples CE 115 and EM 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100. Transmission 160 may include TC 155 and bypass clutch 157 to be integral with transmission or gearbox 160 in some variations. In other contemplated variations, for purposes of further example but not limitation, HEV 100 is configured to be a powersplit vehicle, such that transmission 160 is configured in a split-transmission arrangement that is employed without differentials 152a, 152b, and/or without TC 155 to enable direct control of power transmitted to and regenerative power recovered or captured from wheels 154a, 154b, 154c, 154d.

Powertrain 110 and/or driveline 105 further include one or more invertor system controller(s) (ISC or ISCs) 165, which are coupled to the various other system controller(s) and respective EMs 120, 123 and batteries 170, 175, and/or 180, any and/or each of which components may be cooperatively and independently adjustable, selectable, and operable. In some optionally preferred arrangements, at least one EM 120 (and/or EMs 190a, 190b) is/are respectively coupled with one axle 106, wheels 154a, 154b, and one separate battery 170 and one separate ISC 165, and another EM, such for example EM 123 (and/or EMs 190c, 190d), is respectively coupled with a different axle 107, wheels 154c, 154d, a different and separate battery 175, and a different and separate ISC 167. In further variations, one separate ISC 165 may be coupled with a front axle of HEV 100, which may be either of axles 106, 107 and may be referred to as a front ISC or FISC 165, while the other ISC 167 may be coupled with a rear axle, which would be another of the axles 106, 107, such that it may be referred to as a rear ISC or RISC 167. In this example, FISC 165 may be utilized to front wheel drive (FWD) operation, while RISC 167 may be utilized for rear wheel drive (RWD) operation, and both may be used for all wheel drive (AWD) operation.

One or more such batteries 170, 175 are and may be a higher voltage, direct current battery or batteries 170, 175 operating in various ranges according to the intended vehicle configuration and applications. In various examples, illustrated here for purposes of example but not limitation, such batteries can be configured to operate in ranges up to about 600 volts, and prospectively as high as about 1,000 volts, and sometimes between about 140 and 420 volts, or more or less, which is/are used to store and supply power for EM 120, and other vehicle components and accessories. Other batteries can be a low voltage, direct current battery(ies) 180 operating in the range of between about 6 and 24 volts and 48 volts, or more or less, which is/are used to store and supply power for starter 135 to start CE 115, for such exemplary HEVs 100 that may include a starter in some adaptations, and for powering other vehicle components and accessories during vehicle idle, stop, engine off, and electric motor/generator off conditions.

Although the batteries 170, 175, 180 described here for purposes of example may be known to those skilled in the technology as lead-acid, lithium ion, nickel metal hydride, and other chemistries, many other energy storage devices are contemplated herein as being suitable for purposes of the disclosure. For further example, such batteries 170, 175, 180 may cooperatively store energy with and/or may be replaced entirely by ultracapacitors, flywheels, fuel cells, and a number of energy storage devices and associated components and systems, which may be utilized alone, in combination, and as supplemental and/or replacement devices for the contemplated energy storage purposes of the exemplary and illustrative chemical batteries.

In these arrangements, and for various HEVs 100 that may be configured as a plug-in HEV (PHEV), and/or full HEV (FHEV), one or more of the batteries 170, 175 may be further configured to operate in charge sustain and/or charge depletion modes according to the mode of vehicle operation and configuration of the specific battery. Those skilled in the field of technology may be able to understand that such exemplary, combined charge sustain and charge depletion modes of operation are typically confined to such HEVs 100 that are configured with at least one PHEV configured battery or batteries, since other types of such contemplated batteries are designed and/or preferred for non-PHEV modes of operation such as either charge sustain or charge depletion modes but not both. For further example, battery(ies) 170, 175 may be selected and configured to have an energy capacity of approximately one kilowatt-hour. This exemplary arrangement is for purposes of illustration, and as a further example can enable an electric range or operating range of about 1 to 3 miles or so during vehicle speeds under about 30 miles per hour and when vehicle accelerations are mild. In this way, the batteries 170, 175 may be utilized in FHEVs as a "power cell" battery enabling relatively high discharge rates at up to charge depletion and/or charge sustain maximum discharge limit rates, for comparatively short time durations and limited distances, speeds, and accelerations, when compared to other types of battery configurations and HEV modes of operation.

In another example, at least one and/or another of the battery(ies) is configured to operate in alternating and/or both charge sustain and charge depletion modes, and in some applications as a power cell and in other applications as an "energy cell" and PHEV battery. For further examples, but not for purposes of limitation, such batteries and/or may have an energy range, depending upon the vehicle configuration and intended applications, of approximately between 2 and 10 kilowatt-hours, or more or less, and an electric operating range or electric range of about between 2 and 49 miles, or more or less. When utilized in combination with the various controller(s) of such HEVs 100, such as ISCs 165, 167, and other components, these batteries, for purposes of example without limitation, can be utilized in FHEV and PHEV configured HEVs 100, and may be employed with various other of such batteries 170, 175 to increase flexibility in configuring and utilizing such HEVs 100 and integrated components and systems.

The disclosure further contemplates one or more and/or at least one battery(ies) being configured to operate in a PHEV charge depletion mode as an energy cell having relatively higher energy storage capacity and time/distance utilization ranges, and to have an energy capacity of approximately exceeding 10 kilowatt-hours, or thereabout, and an electric range or electric operating range exceeding about 50 miles or so, and which can be adapted to have an energy capacity of approximately 10 to 30 kilowatt-hours or more or less, and an electric operating range of about 50 to 300 miles or more or less. Such "energy cell" configurations may be utilized in either or both charge deplete and sustain modes, to enable adjustable energy storage device discharge rates.

Batteries 170, 175, 180 are respectively coupled to engine 115, EMs 120, 123, 190*a*, 190*b*, 190*c*, 190*d*, ISCs 165, 167, and other components, controllers, and systems of vehicle 100, as depicted in FIG. 1, through various mechanical and electrical interfaces and vehicle controllers, as described elsewhere herein. High voltage EM batteries 170, 175 are coupled together and/or separately to EMs 120, 123, 190*a*, 190*b*, 190*c*, 190*d*, and ISCs 165, 167, by one or more of a motor control module (MCM), a battery energy and/or electrical control module (BCM or BECM), and/or power electronics 185, among others.

These components are cooperatively configured to condition direct current (DC) power provided by high voltage (HV) batteries 170, 175 for EMs 120, 123, 190*a*, 190*b*, 190*c*, 190*d*. ISCs 165, 167, and/or MCM/BCM/BECM 185 are also configured to condition, invert, and transform DC battery power into three phase alternating current (AC) as is typically required to power electric machines or EMs 120, 123, 190*a*, 190*b*, 190*c*, 190*d*. MCM/BCM/BECM 185 and/or ISCs 165, 167 are also configured to charge one or more batteries 170, 175, 180 with electrical energy generated by EMs 120, 123, 190*a*, 190*b*, 190*c*, 190*d*, and/or FEAD components, and to supply power to other vehicle components as needed.

Vehicle 100 may also incorporate one or more propulsive and decelerating EMs and/or brakes 190*a*, 190*b*, 190*c*, 190*d* coupled respectively to one or more of axle(s) 106, 107, wheels 154*a*, 154*b*, 154*c*, 154*d*, and brake system control module (BSCM) 195, and/or other controllers. Axle(s) 106, 107, EMs/brakes 190*a*, 190*b*, 190*c*, 190*d*, and/or BSCM 195 may be operative to mechanically (for example, frictionally) and/or electrically decelerate wheels 154*a*, 154*b*, 154*c*, 154*d*, and to enable electrically regenerative braking that captures mechanical deceleration energy from wheels 154*a*, 154*b*, 154*c*, 154*d*, and in cooperation with one or more of ISCs 165, 167, MCM/BECM 185, EMs 120, 123, 190*a*, 190*b*, 190*c*, 190*d*, and possibly other controllers and components, enables generation of electricity for storage in and charging of HV battery(ies) 170, 175, and other batteries 180, and other power storage components.

In further variations, EMs and/or brakes 190*a*, 190*b*, 190*c*, 190*d* may also be configured as propulsive EMs having integrated regenerative braking and/or mechanical braking components and capabilities associated with each of respectively coupled wheels 154*a*, 154*b*, 154*c*, and 154*d*. Opposite wheels 154*a* and 154*b*, as well as 154*c* and 154*d*, may be respective opposite left and right wheels of vehicle 100. In this contemplated EM and/or braking configuration, braking EMs 190*a*, 190*b*, 190*c*, 190*d* may be incorporated with vehicle 100 instead of and/or in combination with EMs 120, 123, and are controllable with the various described controllers, including for example ISCs 165, 167, MCM/BECM 185, and other controllers.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with EMs 120, 123, ISCs 165, 167, MCM/BECM 185, braking EMs 190a, 190b, 190c, 190d, BSCM 195, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

While illustrated here for exemplary purposes, as discrete, individual controllers, ISCs 165, 167, MCM/BECM 185, BSCM 195, VSC 200 and VCS 205 may control, be controlled by, communicate signals to and from, and communicate with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller," "at least one controller," "one or more controllers," and/or "the controller(s)" is intended to refer to such controllers both in the singular and plural connotations, and individually, collectively, and in various suitable cooperative, embedded, and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to modify, convert, precondition, and preprocess particular signals during communications, and before and after such are communicated.

In further illustrations, ISCs 165, 167, MCM/BECM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, SmartDeviceLink.com, www.ford-.com, U.S. Pat. Nos. 9,080,668, 9,042,824, 9,092,309, 9,141,583, 9,141,583, 9,680,934, and others). Vehicle 100 also may include a powertrain control unit/module (PCU/PCM) 215 coupled to VSC 200 or another controller, and coupled to CAN 210 and engine 115, EMs 120, 123, and TC 155 to control each powertrain component. A transmission control unit may also be coupled to VSC 200 and other controllers via CAN 210, and is coupled to transmission 160 and also optionally to TC 155, to enable operational control. An engine control module (ECM) or unit (ECU) or energy management system (EMS) 220 may also be included to be in communication with CAN 210, and is coupled to engine 115 and VSC 200 in cooperation with PCU 215 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, EMs 120, 123, TC 155, transmission 160, ISCs 165, 167, batteries 170, 175, 180, MCM 185, and BSCM 195, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

The embodiments of vehicle 100 in FIG. 1 also depict exemplary sensors and actuators in communication with vehicle network and CAN 210 that can transmit and receive signals to and from VSC 200, VCS 205, and other controllers. In further examples, vehicle 100 may include an accelerator pedal position and motion sensor (APP) 225, a brake pedal position and motion sensor (BPP) 230, and other driver controls and vehicle profile and performance parameters and repository (VPP) 235, which may include autonomously generated and/or driver selectable vehicle performance preference profiles and parameters, and autonomous and/or driver selectable vehicle operational mode configurations and sensors, and related profile parameters and settings.

Such VPPs 235 and settings may be autonomously and/or driver selectable, and may establish various preferred and/or predetermined vehicle performance characteristics and modes of operation, as described elsewhere herein. APP 225 may for example be coupled with the various controllers, such as PCU/PCM 215, ECM/ECU 220, and others, to generate and/or enable such controllers to generate a torque demand signal (TDS) 240.

BPP 230 may be further cooperatively coupled to and communicate with other systems, controllers, and sensors including for example brakes/EMs 190*a*, 190*b*, 190*c*, 190*d*, and BSCM 195, and be configured to generate and/or enable such controllers to generate a braking signal (BS) 245. Such controllers are and may be configured to respond to BS 245 and to adjust one or more and/or at least one of EMs 120, 123, 190*a*, 190*b*, 190*c*, 190*d*, to recover and capture mechanical braking energy from one or more of axle(s) 106, 107 and wheels 154*a*, 154*b*, 154*c*, 154*d*, and to generate therefrom negative torque that is converted into electrical energy that is utilized to charge at least one of and/or each of the separate batteries 170, 175, and/or 180, and/or other energy storage devices.

Vehicle 100 may also have VCS 205 configured as and/or with one or more communications, navigation, and other sensors, as described with respect to the SYNC onboard vehicle computing system, and other similar systems. VCS 205 can cooperate with VSC 200 and other controllers to manage and control vehicle 100 in response to sensor and communication signals identified, established by, and received from these and similar vehicle systems and components.

VCS 205 is also configured to cooperate in parallel, in series, and distributively with VSC 200, and other controllers to manage and control the vehicle 100 in response to sensor and communication signals identified, generated by, established by, communicated to, and received from such vehicle systems and components. Such parameters, profiles, and settings of such profiles, may be driver selectable, adjustable, and viewable through a vehicle user interface of an onboard vehicle computing system, such as the above-noted Ford SYNC system, which can be a part of, work in connection with, and/or incorporated as VCS 205, and other controllers and systems.

HEV 100 utilizes such sensors, parameters, and settings to enable performance control operational mode capabilities, in conjunction with the one or more controllers that are configured to manage such capabilities. For example, signals from a driver and various HEV components such as MCM/BCM 185 and APP 225, may demand power from CE 115 and/or EMs 120, 123, 190*a*, 190*b*, 190*c*, 190*d*, and may be embedded in and/or cause the controller(s) to generate TDS 240. In addition to TDS 240 and BS 245, the controllers may also generate various HEV control signals (CS) 250 and other signals (OS) 255, wherein any and/or all of such signals are utilized to communicate data to, between, and from various HEV components, sensors, systems, and controllers. Further, the controllers may embed information in and extract information from such signals, and may also communicate directly with other vehicle controllers, sensors, actuators, systems, and components, to enable various communications and operations.

For further example, various other vehicle functions, actuators, and components may be controlled by the controllers within the vehicle systems and components, and may receive signals from other controllers, sensors, and actuators, which may include, for purposes of illustration but not limitation, an alternator or generator, EMs 120, 123, 190*a*, 190*b*, 190*c*, 190*d*, ISCs 165, 167, high and low voltage batteries 170, 175, 180, and various sensors for regenerative braking, battery charging or discharging, operation mode control signals, maximum charge, state of charge signal (SoC signal), and battery and storage device charge and discharge power limits, charge power limits, discharge power limits, charge depletion and sustain charge limits, and temperature, voltage, current, differentiated and/or integrated current over time, drive train torque commands and detected torques, as well as digital data and information embedded in such signals, and as described in more detail elsewhere herein.

As depicted in the various FIGS. 1 and 2, and elsewhere herein, such control logic and executable instructions and signals, and data can also include vehicle control or command signals received from and sent to vehicle controllers, components, and systems. Such signals and commands may be generated by and communicated from any of the vehicle controllers, sensors, actuators, components, and systems. Other such controller(s), sensor(s), actuator(s), and components may also receive and be responsive to such signals. Any or all of these signals can be raw analog or digital signals or preconditioned, preprocessed, combination, and/or derivative signals generated in response to other signals, and embedding information therein.

Figure 3:
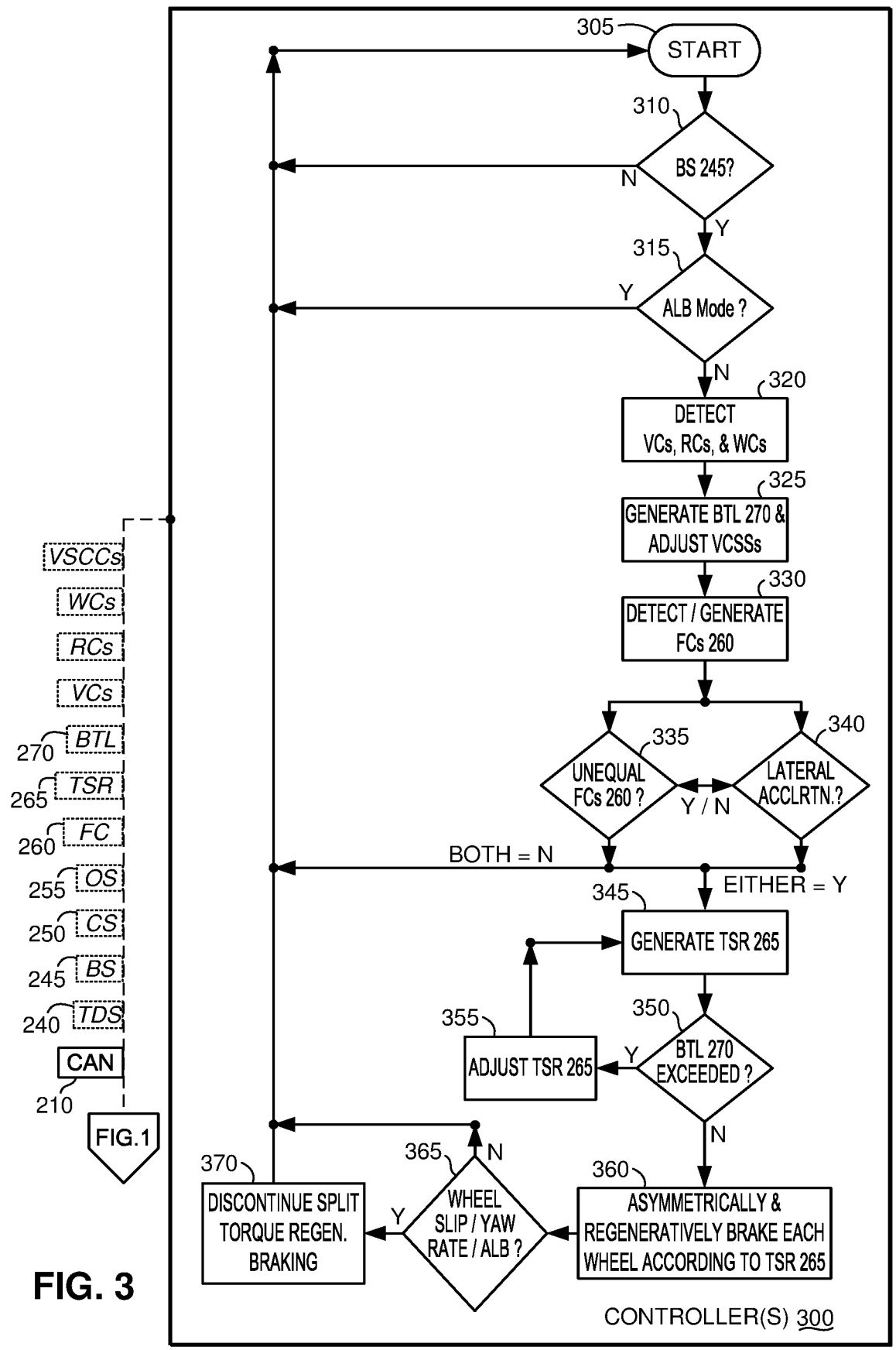
FIG. 3 illustrates additional aspects and capabilities of the vehicle and systems and methods of FIG. 1, with certain components and features added, removed, modified, and rearranged.

The communication and operation of the described signals and commands, control instructions and logic, and data and information by the various contemplated controllers, sensors, actuators, and other vehicle components, may be represented schematically as shown in FIG. 1, and by flow charts or similar diagrams as exemplified in FIG. 3, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases, may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIGS. 1 and 2, HEV 100 incorporates controller(s) such as any and/or all of those described elsewhere herein that is/are coupled to EMs 120, 123, 190*a*, 190*b*, 190*c*, 190*d*, ISCs 165, 167, and/or HV battery(ies) 170, 175. The controller(s) is/are configured to respond to the described signals, including for example TDS 240, BS 245, CS 250 and/or OS 255, and to detect various vehicle parameters and conditions, and to adjust various modes of operation of HEV 100 and the various components and systems thereof. In a specific example, HEV 100 includes at least one and/or one or more axle(s) 106, 107, each respectively coupled to and driven by EMs 120, 123, 190*a*, 190*b*, 190*c*, 190*d*, which EMs are respectively coupled with separate batteries 170, 175, as is depicted schematically in FIG. 1.

Vehicle 100 includes in examples of the disclosure at least one and/or one or more of the controllers coupled with powertrain 110 having one or more and/or at least two EMs 190*a*, 190*b*, 190*c*, 190*d*, each coupled to respective drive wheels 154*a*, 154*b*, 154*c*, 154*d*. The disclosure also includes the controllers and components of vehicle 100 configured to generate asymmetric maximum regenerative braking torque with the motors or EMs 190*a*, 190*b*, 190*c*, 190*d*, when opposite side wheels 154*a*, 154*b* and/or 154*c*, 154*d*, have unequal friction coefficients (FCs) 260, such as during cornering and certain vehicle, road, wheel, and wheel dynamics conditions, such that the maximum regenerative braking torque does not exceed predetermined braking force limits, which prevents wheel to road slippage while maximizing braking energy recovery for electrical power generation and storage. Such contemplated FCs 260 are termed here to refer to the respective, total or net coefficient of friction between a wheel or tire 154*a*, 154*b*, 154*c*, 154*d*, and a road surface during operation of HEV 100. As may be known to and/or apparent to persons having skill in the relevant fields of technology, FCs 260 are correlated and/or established as a function or respective coefficients of friction of individual wheels and road surfaces, and can be affected by the various other variables, parameters, and conditions described herein.

The vehicle and/or HEV 100 of the disclosure includes the left and right drive wheels 154*a*, 154*b*, 154*c*, 154*d*, each coupled to a respective EM 190*a*, 190*b*, 190*c*, 190*d*. The HEV also incorporates one or more and/or at least one controller(s) configured to generate a torque split ratio (TSR) 265 during braking of HEV 100. In various arrangements, TSR 265 is generated in response to at least one of and/or one or more of: a lateral acceleration during cornering, and/or unequal FCs 260 generated and/or detected for each wheel 154*a*, 154*b*, 154*c*, 154*d*, during such braking operation of HEV 100.

In further illustrative variations of the disclosure, the controller(s) are also configured to generate electric power with at least one of and/or one or more of the motors or EMs 190*a*, 190*b*, 190*c*, 190*d*, by regeneratively braking each wheel 154*a*, 154*b*, 154*c*, 154*d*, with unequal braking and/or negative torques that are adjusted by TSR 265, and such that combined wheel braking torque for all wheels of HEV 100 do not exceed a total braking torque limit (BTL) 270 for HEV 100, according to vehicle stability and control constraints (VSCCs) established according to VCs, RCs, and/or WCs, and/or experimentally determined during vehicle design and testing, and stored in repository and as VPPs 235.

BTL 270 for HEV 100 is predetermined and is a function of vehicle weight, speed, acceleration/deceleration, and wheel and road friction, among other parameters, and is different for each HEV 100, and is generally established during vehicle design and experimental testing on various road conditions (wet, dry, and varying temperature, material, and surface configurations), for various vehicle configurations (two wheel drive, all wheel drive, differential wheel drive, and varied suspension, braking, and vehicle performance settings and configurations), and as a function of various tire configurations, conditions, and dynamics and performance capabilities (temperature, material, pressure, tread arrangements, etc.).

In further modifications of the disclosure, HEV 100 also includes one or more of the controller(s) configured to respond to BS 245, and in response to adjust BTL 270 in further response to one or more of equal or unequal FCs 260, speed, deceleration rate, VSCCs, and configuration of HEV 100, such that braking by EMs 190*a*, 190*b*, 190*c*, 190*d* does not cause tire to road slippage of one or more of wheels/tires 154*a*, 154*b*, 154*c*, 154*d*. In variations, the controller(s) are also coupled to one or more sensors that include vehicle condition sensors (VSs) 275 to detect vehicle conditions (VCs), road condition sensors (RSs) 280 to detect road conditions (RCs), and/or wheel dynamics sensors (WDSs) 285 to detect wheel dynamics and conditions (WCs). In additional adaptations, VSs 275 include one or more sensors that detect, and communicate conditions via CAN 210 and other vehicle networks, vehicle drive modes (two wheel, all wheel, differential, etc.), and settings, conditions, and configurations of suspension, braking, body and frame stresses, strains, accelerations, and orientations, and other vehicle components and subsystems.

The disclosure also includes RSs 280 configured to detect temperature, humidity, precipitation (water, ice, snow), polishing, flushing, roughness, lateral and longitudinal incline, and other road features and conditions, which can be detected utilizing various hardware devices that include, for purposes of example without limitation, mechanical, analog, digital, and combination environmental, imaging, and similar types of sensors 280. In other examples, WDSs 285 include temperature, pressure, speed, orientation, vibration, tire tread wear detectors, and similar types of sensors, and can also include preconfigured data storage devices embedded in each wheel 154*a*, 154*b*, 154*c*, 154*d* that respond to inquiries to report factory wheel size, type, tread, and related predetermined performance parameters for each wheel.

Utilizing the data detected by and reported from one or more of and/or at least one of the contemplated sensors 275, 280, 285, the one or more controller(s) of HEV 100 are also configured to generate and/or detect the unequal FCs 260. For example, the controller(s) utilized the data received from WDSs 285 to determine current and/or instantaneous wheel friction, and utilize data received from RSs 280 and VSs 275, and generate and/or detect the equal or unequal FCs 260 for each wheel as function of such data.

In one simplified example, the controller(s) utilize speed, acceleration, and weight of HEV 100 from VSs 275, wheel temperature, tread condition, rotational speed, differences between speeds of each wheel 154*a*, 154*b*, 154*c*, 154*d*, and pressure from WDSs 285, and roadway temperature and wet-dry condition, and optionally one or more predetermined formulae and/or lookup tables from repository and VPP 235, to generate and/or detect the equal or unequal FCs 260. Those knowledgeable in the technical field, also sometime have referred to such resultant FCs 260 as "mu" (symbolized as the Greek alphabet letter pronounced in English as "mu"), and have also referred to such unequal FCs 260 as "split mu" road conditions to represent that the coefficients of road surface and wheel/tire adhesion are different between each wheel 154*a*, 154*b*, 154*c*, 154*d*.

In response to the generated and/or detected FCs 260, the controller(s) of HEV 100 are also configured to generate TSR 265 according to a predetermined function and/or lookup table, or functions and lookup tables, which may be stored in repository VPP 235, and which enables generation of TSR 265 utilizing one or more of real-time lateral and/or longitudinal acceleration(s) of HEV 100 detected by VSs 275, and road and wheel data detected by RSs 280, WDSs 285, and other vehicle VPPs 235 and data, which are correlated and/or mapped to a respective plurality of TSRs 265. In further examples of the disclosure, the controller(s) and other components of HEV 100 are configured to generate TSR 265 to be zero, when FCs 260 are equal and/or lateral acceleration of HEV 100 is zero.

In this illustrative variation of the disclosure, and with reference now to FIG. 2, and for purposes of example without limitation, right turns of HEV 100 (left side of FIG. 2) are conventional termed herein to generate negative lateral acceleration, while left turns (right side of FIG. 2) are conventionally termed herein to generate positive lateral accelerations. For purposes of convention in this disclosure, accelerations may be normalized to be measured in terms of a multiple of the gravitational constant at the surface of Earth, which is about 32 meters per second squared, which is also termed here as one "g" or "1 g." The controller(s) is/are configured to generate TSR 265 according to the function and/or lookup table of repository and VPP 235, as a further function of the normalized acceleration.

FIG. 2 depicts a two-dimensional representation of the contemplated functions and lookup tables, and to include example data points representing TSRs 265, and magnitudes and/or directions of lateral accelerations, but should be understood by those skilled in the relevant arts to also be analogously representative of a similar relationship between TSRs 265 and parameters such as FCs 260, and others, which can be schematically represented with additional dimensions and depictions.

In this continuing example, TSR 265 is configured to vary between some predetermined range, which may be changed according a particular application and HEV 100 configuration. In a further example, without intending to limit the possible adaptations of the disclosure, the controller(s) are configured to vary TSR 265 between a minimum torque split ration 265 of about 0.25 for left turns, and a maximum TSR 265 of about 4.00, for purposes of illustration. During straight driving conditions, when HEV 100 is not turning left or right such that lateral acceleration is zero, and/or when FCs 260 are detected/generated to be equal, and in response to BS 245, the controller(s) generate TSR 265 to be one or "1", such that regenerative braking, negative torque is equally applied to wheels 154a, 154b, 154c, 154d, respectively by EMs 190a, 190b, 190c, 190d.

During right turn operations that impose a lateral acceleration on HEV 100, for example of about −1 g, the function and/or lookup table may generate by the controller(s) a maximum TSR 265 of about "4". In contrast, and in a further illustrative example, during a left turn that causes an opposite lateral acceleration, for example of about +1 g, the function and/or lookup table may generate by the controller(s) a minimum TSR 265 of about 0.25. The controller(s) and/or contemplated function and/or lookup table in further variation are also modified to extrapolate and/or interpolate, and to generate additional and/or a plurality of intermediate and/or extended TSRs 265, in response to other detected accelerations and/or FCs 260. Example intermediate values of acceleration and correlated TSRs 265 are also reflected in FIG. 2. In some modifications of the disclosure, it may be preferred to enable the function(s) and/or lookup table(s) to generate a maximum and a minimum TSR 265, which may be established according to the configuration and performance capabilities of HEV 100.

In additional arrangements of the disclosure, the controller(s) and/or VSs 275 are configured to include, for example, accelerometers, and position and speed sensors, and to detect vehicle conditions that affect and may affect FCs 260, and which but are not limited to include one or more of lateral and longitudinal accelerations, steering angle, yaw rate, and vehicle speed and configuration (wheel drive modes, and suspension, braking, performance settings and configurations), among other vehicle parameters that may cause, impart, and/or result in unequal FCs 260. In further variations, the RSs 280 include the described imaging and other sensors that are configured to detect conditions that also affect or may affect the FCs 260, and which include but are not limited to one or more and/or at least one of ice, snow, and water on road surfaces, as well as roadway polishing (due to road surface wear over time) and flushing (due to seepage of asphalt and other roadway material constituents to the road surface).

Further modifications of the disclosure are directed to the WDSs 285 also configured to detect conditions that affect or that may affect the FCs 260, and which include for example, pressure and temperature, rotation speed, wheel slip, total distance driven and estimated tread wear parameters, and differences in speed between driven, non-driven, left, right, front, and rear wheels/tires 154a, 154b, 154c, 154d, during acceleration, cornering, and braking, among other parameters and operations.

As TSRs 265 are generated during operations that enable split torque, regenerative braking of wheels 154a, 154b, 154c, 154d, the controller(s) operate EMs 190a, 190b, 190c, 190d such that, for example, regenerative, negative wheel torque for the right side wheels 154a and/or 154c, is adjusted according to the product of total BTL 270 and TSR 265, while negative torque for the opposite left side wheels 154b and/or 154d is adjusted to be the difference between the total BTL 270 and the right-side product. In this way, regenerative split torque during cornering of vehicle 100 and/or when unequal FCs 260 are detected is continuously adjusted to maximize energy recovery by generating maximum available power from EMs 190a, 190b, 190c, 190d, during braking of HEV 100.

The disclosure also contemplates that controller(s), such as power electronics 185 configured to, during regenerative braking, adjust EMs 190a, 190b, 190c, 190d, and others, and power electronics of HEV to charge the one or more batteries utilizing the generated power. These variations of the disclosure also contemplate configurations of the controller(s) that detect at least one or and/or one or more of a vehicle antilock braking (ALB) mode of operation, wheel slip and vehicle yaw and rates thereof, among other parameters, and to disengage regenerative braking by the EMs, when the antilock braking (ALB) mode of operation is engaged, and/or at least one of the wheel slip, vehicle yaw, and other parameters are detected, and/or are detected to exceed predetermined, respective slip and yaw rates that exceed those permitted according the VSCCs.

The disclosure also contemplates additional methods of operation and control of vehicles and HEVs 100, which may be understood by those knowledgeable in the relevant fields of technology with continuing reference to FIGS. 1 and 2, and also now specifically to FIG. 3. During operation, at least one and/or one or more of the controller(s) 300 described elsewhere herein, such for example without limitation, MCM/BECM and power electronics 185, BSCM 195, VSC 200, VCS 205, PCU/PCM 215, ECM/ECU 220, and/or others, are configured to enable the capabilities of HEV 100 contemplated in the disclosure, and during the various modes of operation and vehicle control. In various examples, HEV 100 is configured with the controller(s) 300, coupled to the left and right drive wheels 154a, 154b, 154c, 154d, and each wheel coupled with and/or having the respective electric motors 190a, 190b, 190c, 190d described elsewhere herein, among other controller(s), components, and subsystems.

The controller(s) 300 initiate(s) commands and control logic at step 305, and detects BS 245 at step 310, among other parameters and conditions of HEV 100. If BS 245 is not detected, control returns to the start step for continued monitoring. Otherwise, at step 315, the controller(s) monitor for engagement of the anti-lock braking (ALB) mode of operation, which if detected returns control again to start step 305 for further monitoring. When BS 245 is detected without ALB being engaged, method control moves to step 320, where the controller(s) 300 and methods of operation initiate detecting one or more of and/or at least one of vehicle conditions (VCs), road conditions (RCs), and/or wheel dynamics and conditions (WCs). With these detected conditions, parameters, and configurations, the controller(s) 300 next at step 325, adjust VSCCs and generate BTL 270, as described elsewhere herein.

The methods proceed to step 330 and generate/detect FCs 260 according to one or more of the detected VCs, RCs, and/or WCs. At steps 335 and 340, the methods then detect one or more of and/or at least one of unequal FCs 260 and/or lateral accelerations, and if neither unequal FCs 260 and/or lateral acceleration is detected, then control returns to step 305 for continued monitoring. Otherwise, if either unequal FCs 260 and/or lateral acceleration are detected, then control proceeds to step 345, and the methods of controller(s) 300 generate the TSR 265 with the contemplated function and/or lookup table that maps the plurality of predetermined, interpolated, and/or extrapolated TSRs 265, to one or more of the generated FCs 260, lateral acceleration, and/or detected VCs, RCs, and/or WCs.

In variations, the methods also contemplate controller(s) 300 configured at step 350 to detect whether the generated TSR 265, if utilized to initiate asymmetric regenerative braking and to generate electrical power with EMs 190*a*, 190*b*, 190*c*, 190*d*, will cause deceleration that exceeds BTL 270 of HEV 100. If so, control passes to step 355 to adjust TSR 265. Otherwise, control proceeds to step 360 to generate a split, differential, asymmetric negative and regenerative torque for right and left wheels 154*a*, 154*b*, 154*c*, 154*d*, adjusted by TSR 265. In this way, controller(s) 300 initiate generating electric power with the motors/EMs 190*a*, 190*b*, 190*c*, 190*d*, and regeneratively braking each wheel with unequal torques for each wheel 154*a*, 154*b*, 154*c*, 154*d*, as adjusted by the generated and/or adjusted TSR 265.

During regenerative braking and energy recovery/electrical power generation, control proceeds to step 365 to detect whether wheel slippage against the road surface and/or vehicle yawing is/are occurring, at rates that may exceed predetermined respective slip and yaw rates, and whether antilock braking (ALB) mode is engaged, which in any instances, causes control to proceed to step 370, to discontinue split torque regenerative braking. Control by the methods of controller(s) 300 then returns to start step 305 for continued monitoring.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
left and right drive wheels each having an electric motor;
one or more vehicle sensors configured to detect vehicle yaw rate; and
at least one controller configured to:
generate a torque split ratio responsive to unequal friction coefficients detected for each wheel during braking,
generate electric power with the motors by regeneratively braking each wheel with unequal torques adjusted by the ratio, such that combined wheel braking torques do not exceed a total braking torque limit for the vehicle, and
disengage regenerative breaking when the vehicle yaw rate is detected to exceed a predetermined yaw rate threshold.

2. The vehicle according to claim 1, further comprising:
the at least one controller further configured to:
in response to a braking signal,
adjust the total braking torque limit in response to one or more of vehicle speed and deceleration rate.

3. The vehicle according to claim 1, further comprising:
one or more vehicle and road condition sensors; and
the at least one controller further configured to:
  in response to a braking signal,
  generate the unequal friction coefficients for each wheel in response to detected:
    vehicle conditions that include one or more of lateral and longitudinal accelerations, steering angle, yaw rate, and vehicle speed, and
    road conditions that include one or more of ice, snow, and water.

4. The vehicle according to claim 1, further comprising:
one or more vehicle condition and wheel dynamics sensors; and
the at least one controller further configured to:
  in response to a braking signal,
  generate the unequal friction coefficients for each wheel in response to at least one of detected vehicle and wheel conditions that include:
    one or more of lateral and longitudinal accelerations, steering angle, yaw rate, and vehicle speed, and
    dynamics of one or more wheels including differences in speed between wheels during acceleration and braking.

5. The vehicle according to claim 1, further comprising:
one or more storage batteries; and
the at least one controller further configured to charge the one or more batteries utilizing the generated power.

6. The vehicle according to claim 1, further comprising:
a lateral acceleration sensor; and
the at least one controller further configured to:
  generate the unequal friction coefficients for each wheel responsive to lateral acceleration during vehicle cornering, and
  generate the torque split ratio by a predetermined lookup table that maps a plurality of torque split ratios to respective lateral accelerations.

7. The vehicle according to claim 1, further comprising:
one or more vehicle condition sensors; and
the at least one controller further configured to:
  in response to a braking signal,
  generate the unequal friction coefficients for each wheel responsive to detected vehicle conditions including one or more of lateral and longitudinal accelerations, steering angle, yaw rate, and vehicle speed and configuration, and
  generate the torque split ratio by a predetermined lookup table that maps a plurality of torque split ratios to one or more of the accelerations, steering angle, yaw rate, vehicle speed, and vehicle configuration.

8. The vehicle according to claim 1, further comprising:
one or more vehicle and road condition and wheel dynamics sensors; and
the at least one controller further configured to:
  in response to a braking signal,
  generate the unequal friction coefficients for each wheel in response to detected:
    vehicle conditions that include one or more of lateral and longitudinal accelerations, steering angle, yaw rate, and vehicle speed and configuration,
    road conditions that include one or more of ice, snow, and water, and
    dynamics of one or more wheels including differences in speed between driven, non-driven, left, right, front, and rear wheels during acceleration and braking.

9. The vehicle according to claim 1, further comprising:
one or more wheel condition sensors; and
the at least one controller further configured to:
  responsive to braking and acceleration, and
  generate the unequal friction coefficients for each wheel in response to detected dynamics of the wheels including differences in speed between wheels.

10. A vehicle, comprising:
opposite left and right drive wheels each having an electric motor;
one or more vehicle sensors configured to detect vehicle yaw rate; and
at least one controller configured to:
  generate a torque split ratio, in response to lateral acceleration detected during braking,
  generate electric power with the motors by regeneratively braking each wheel with unequal torques adjusted by the ratio and applied by the motors, such that combined wheel braking torques do not exceed a total braking torque limit for the vehicle, and
  in response to a braking signal, disengage regenerative braking when the vehicle yaw is detected to exceed a predetermined yaw rate threshold.

11. The vehicle according to claim 10, further comprising:
the at least one controller further configured to:
  generate the torque split ratio by a predetermined lookup table that maps a plurality of torque split ratios to respective lateral accelerations.

12. The vehicle according to claim 10, further comprising:
one or more vehicle and wheel condition sensors; and
the at least one controller further configured to:
  in response to a braking signal,
  generate unequal friction coefficients for each wheel, responsive to detected vehicle and wheel conditions that include:
    one or more of the lateral acceleration, and longitudinal acceleration, steering angle, yaw rate, and vehicle speed and configuration, and
    dynamics of one or more wheels including differences in speed between wheels during acceleration and braking.

13. The vehicle according to claim 10, further comprising:
one or more vehicle and road condition and wheel dynamics sensors; and
the at least one controller further configured to:
  in response to a braking signal,
  generate unequal friction coefficients for each wheel, in response to detected:
    vehicle conditions that include one or more of the lateral acceleration, and longitudinal acceleration, steering angle, yaw rate, and vehicle speed and configuration,
    road conditions that include one or more of ice, snow, water, polishing, and flushing, and
    dynamics of one or more wheels including differences in speed between wheels during acceleration and braking.

14. A method of controlling a vehicle, comprising:
by at least one controller, coupled to left and right drive wheels each having an electric motor:
  generating a torque split ratio utilizing lateral acceleration detected during braking,
  generating electric power with the motors by regeneratively braking each wheel with unequal torques adjusted by the ratio, such that combined wheel braking torques do not exceed a total braking torque limit for the vehicle, and detecting by one or more vehicle sensors vehicle yaw rate and disengaging regenerative braking when the vehicle yaw is detected.

15. The method of controlling a vehicle according to claim 14, further comprising:

by the at least one controller, generating the torque split ratio by a predetermined lookup table that maps a plurality of torque split ratios to respective lateral accelerations.

16. The method of controlling a vehicle according to claim 14, further comprising:

one or more vehicle and wheel condition sensors; and by the at least one controller, in response to a braking signal, generating unequal friction coefficients for each wheel, from detected vehicle and wheel conditions that include:

one or more of the lateral acceleration, and longitudinal acceleration, steering angle, yaw rate, and vehicle speed and configuration, and dynamics of one or more wheels including differences in speed between wheels during acceleration and braking.

17. The method of controlling a vehicle according to claim 14, further comprising:

one or more vehicle and road condition and wheel dynamics sensors; and by the at least one controller, in response to a braking signal, generating unequal friction coefficients for each wheel, in response to detecting:

vehicle conditions that include one or more of the lateral acceleration, and longitudinal acceleration, steering angle, yaw rate, and vehicle speed and configuration, road conditions that include one or more of ice, snow, and water, and dynamics of one or more wheels including differences in speed between driven, non-driven, left, right, front, and rear wheels during acceleration and braking.

* * * * *